United States Patent [19]
Van Loon et al.

[11] Patent Number: 6,094,889
[45] Date of Patent: *Aug. 1, 2000

[54] METHOD OF FORM AND SEAL PACKAGING

[75] Inventors: Achiel Josephus Van Loon, Schoten; Fiona Donald, Woluwe Saint Lambert; Patrick Henk Espeel, Herent, all of Belgium

[73] Assignee: Exxon Chemical Patents, Inc., Baytown, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/806,182

[22] Filed: Feb. 25, 1997

[51] Int. Cl.⁷ ..................................... B65B 9/08
[52] U.S. Cl. ........................ 53/450; 53/375.9; 428/516
[58] Field of Search .................... 428/515, 516, 428/910, 349, 335 EN; 53/477, 509, 450, 451, 375.9; 264/173.16, 290.2; 156/229

[56] References Cited

U.S. PATENT DOCUMENTS

| | | | |
|---|---|---|---|
| 5,206,075 | 4/1993 | Hodgson | 428/216 |
| 5,322,726 | 6/1994 | Dew | 428/216 |
| 5,358,792 | 10/1994 | Mehta et al. | 428/516 |
| 5,376,439 | 12/1994 | Hodgson et al. | 428/220 |
| 5,397,613 | 3/1995 | Georgelos | 428/36.7 |
| 5,424,362 | 6/1995 | Hwang et al. | 525/71 |
| 5,482,770 | 1/1996 | Bekele | 428/339 |
| 5,530,065 | 6/1996 | Farley et al. | 525/240 |

FOREIGN PATENT DOCUMENTS

| | | |
|---|---|---|
| 597 502 | 5/1994 | European Pat. Off. . |
| WO92/14784 | 9/1992 | WIPO . |
| 94/06857 | 3/1994 | WIPO . |
| 94/25271 | 11/1994 | WIPO . |
| 94/26816 | 11/1994 | WIPO . |
| WO94/26816 | 11/1994 | WIPO . |
| 95/00333 | 1/1995 | WIPO . |
| WO95/13321 | 5/1995 | WIPO . |
| 95/15851 | 6/1995 | WIPO . |
| 95/16729 | 6/1995 | WIPO . |
| 95/21743 | 8/1995 | WIPO . |
| WO97/28960 | 8/1997 | WIPO . |
| WO97/44178 | 11/1997 | WIPO . |

*Primary Examiner*—Vivian Chen
*Assistant Examiner*—D. Lawrence Tarazano
*Attorney, Agent, or Firm*—Catherine Bell; Brent M. Peebles; Joseph F. Reidy

[57] ABSTRACT

A film having a polypropylene surface layer and a polyethylene surface layer is used in fill and seal packaging applications, in which the polyethylene layer consists essentially of a ethylene copolymer having a narrow molecular weight distribution ethylene and a CBDI of greater than 50%. The package is formed by heat sealing the polyethylene surface to the polypropylene surface of the film to form a transverse seal.

6 Claims, 5 Drawing Sheets

METHOD OF FORM AND SEAL PACKAGING

FIELD OF THE INVENTION

This invention relates to heat sealable films comprising at least a layer of polyethylene, preferably metallocene polyethylene (mPE) and a layer of polypropylene.

BACKGROUND OF THE INVENTION

Polyethylene has traditionally been used as a sealing layer in polyolefin films and packaging because of its ability to seal quickly and maintain a strong seal strength. Typically polyethylene has been coextruded, laminated or otherwise bonded to other polyolefins which have better strength than polyethylene, yet do not seal as well. For example, in a typical multilayer films, a polypropylene layer, especially a mono or biaxially oriented polypropylene (OPP) layer, provides a high clarity, high melting, high barrier properties, combined with high stiffness, while a polyethylene layer will provide extra body to the film and will allow a low sealing temperature, meaning higher packaging speeds. However, polypropylene (PP) and polyethylene (PE) have very limited compatibility and direct sealing of polyethylene onto polypropylene film is not commonly done. When a layer of PE is combined with a layer of PP, extra primer may be needed. For example, extra primer is used when polyethylene, such as low density polyethylene, is coated onto polypropylene films. In addition tie layers may also be necessary. Coextrudable tie layers such as ethylene vinyl acetate copolymers, typically having more that 8 weight % vinyl acetate, have been extruded between PP and PE to enhance adhesion between the PE and the PP.

Furthermore, since polyethylene does not seal well to polypropylene, the sealing operation for films containing PE and PP layers typically has to be performed inside versus inside. This causes difficulties in traditional "form, fill and seal" applications. During form, fill and seal operations, a first transverse seal is made to shape the flat film into a tube. This tube is then transported to the top/bottom sealing bars, where the actual bags will be made. Thereafter a bottom seal is made, the bag is filled and a top seal is made. In the past when polyethylene/polypropylene film has been used in form, fill and seal applications, the transverse seal had to be made between the two inside surfaces of the tube. This seal was then typically folded to produce a flat tube which thereafter resulted in the formation of a "thick spot" where the bottom and top seals were made.

(At the transverse seal four film layers were between the sealing bars, while at the other sealing areas, only two film layers were between the sealing bars.

These thick spots, where the transverse seals cross the top and bottom seals, are typically weak points in the packaging and are particularly undesirable in applications requiring perfect seals, such as Modified or Controlled Atmosphere Packaging (MAP/CAP). However if the transverse seal could be made by sealing the inside polyethylene layer to a polypropylene outside layer (or vise versa) and still obtain a high performing seal, the number of weak spots (i.e. leaks) would be reduced immediately and the overall packaging speed could be increased with greater packaging quality.

Likewise, since oriented polypropylene/polyethylene film structures are typically used to package small quantities of various goods, (e.g. 300 grams of nuts, 500 grams of candy, etc.) a significant material savings could be obtained if the polyethylene layer could be sealed directly onto the oriented polypropylene outer layer.

Therefore there is a need in the art to provide a means to seal polyethylene to polypropylene, particularly oriented polypropylene.

WO 95/00333 discloses heat shrinkable films where an outer layer of a multilayer heat shrinkable film is an ethylene or propylene polymer formed by polymerization in the presence of a single site catalyst. EXACT™ resins are disclosed as suitable as the outer layer, but traditional polypropylene is not disclosed as a suitable second surface layer.

EP Patent Application 0 597 502 discloses oriented single and multilayer films of metallocene polyethylenes, however polypropylene is not disclosed as a layer.

U.S. Pat. No. 5,482,770 discloses irradiated oriented multilayer films having a barrier layer of EVOH and other core or sealayers of metallocene polyethylenes. Polypropylene is not disclosed as a layer.

Art disclosed for U.S. purposes includes U.S. Pat. Nos.: 5,530,065; 5,397,613; 5,376,439; 5,358,792; 5,206,075; and PCT publications WO 95/21743; WO 95/16729; WO 95/15851; WO 94/26816; WO 94/25271; WO 94/06857.

SUMMARY OF THE INVENTION

This invention relates to a film comprising:

(i) a first surface layer comprising a homopolymer of ethylene having an Mw/Mn of 3 or less or a copolymer of ethylene and up to 50 weight % of a $C_3$ to $C_{20}$ olefin, wherein the copolymer has a CDBI of 50% or more, preferably 60% or more, and (ii) a second surface layer comprising a homopolymer of propylene or a copolymer of propylene and up to 50 weight % of a comonomer, preferably copolymerized with ethylene and/or a $C_4$ to $C_{20}$ olefin.

This invention also relates to films as described above where one or both of the layers are oriented in one or more directions to the same or different extents.

FIGURES

FIG. 1 is a graph of rupture strength as a function of seal bar temperature when all seal bars were set to the same temperature and a seal time of 300 msec was employed. Individual data points were selected from Tables 7, 8, 9 and 10. Film 1 is the diamond shape (-♦-). Film 2 is the square shape (-■-). Film 3 is the triangle shape (-▲-). Film 4 is the circle shape (-●-).

FIG. 2 is a graph of strength as a function of seal bar temperature when all seal bars were set to the same temperature and a seal time of 400 msec was employed. Individual data points were selected from Tables 7, 8, 9 and 10. Film 1 is the diamond shape (-♦-). Film 2 is the square shape (-■-). Film 3 is the triangle shape (-▲-). Film 4 is the circle shape (-●-).

FIG. 3 is a graph of strength as a function of seal bar temperature when all seal bars were set to the same temperature and a seal time of 500 msec was employed. Individual data points were selected from Tables 7, 8, 9 and 10. Film 1 is the diamond shape (-♦-). Film 2 is the square shape (-■-). Film 3 is the triangle shape (-▲-). Film 4 is the circle shape (-●-).

FIG. 4 is a graph of the data in Table 12. Film 1 is the diamond shape (-♦-). Film 2 is the square shape (-■-). Film 3 is the triangle shape (-▲-). Film 4 is the circle shape (-●-).

DETAILED DESCRIPTION OF THE INVENTION

Figure 1:
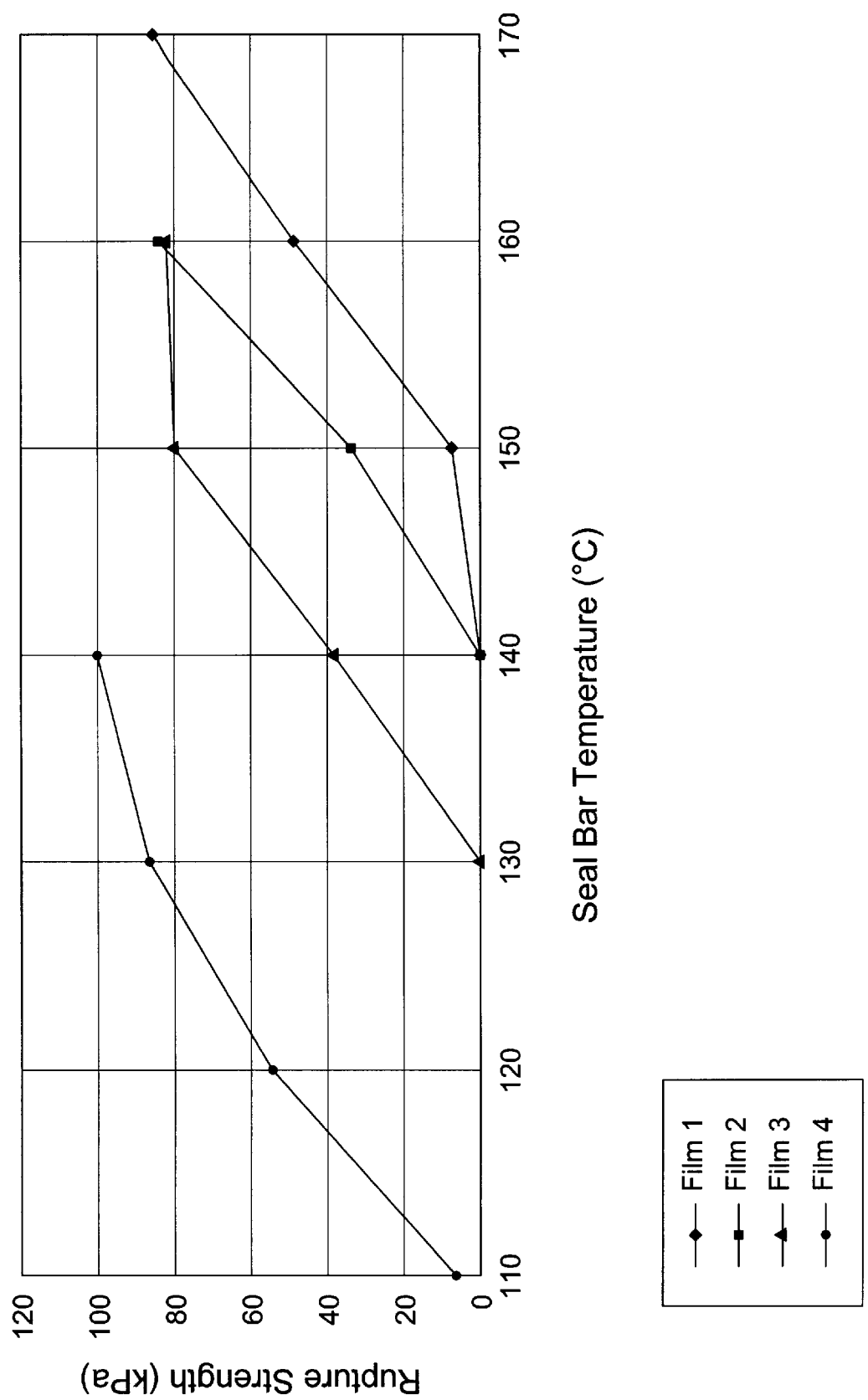
Figure 2:
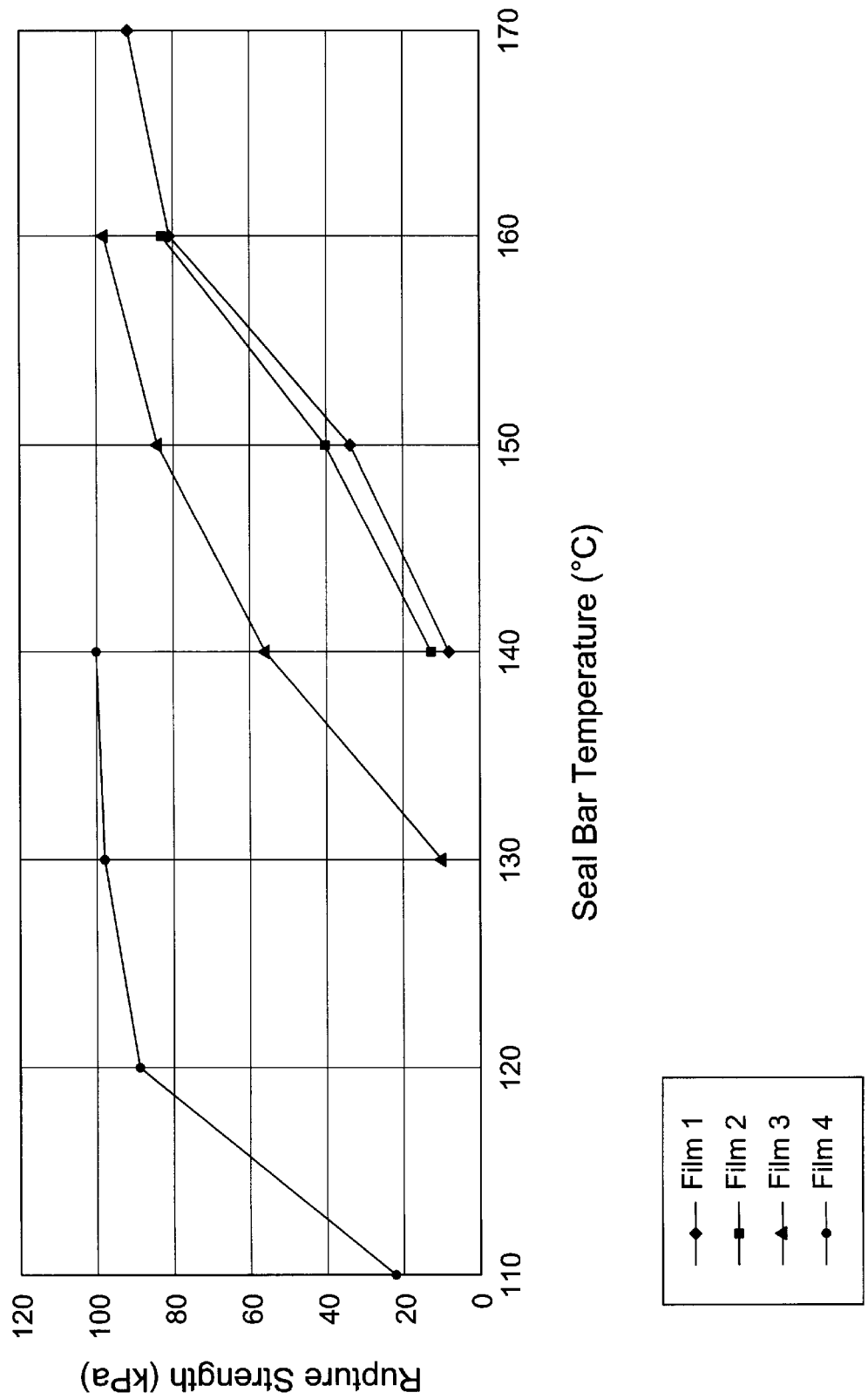
Figure 3:
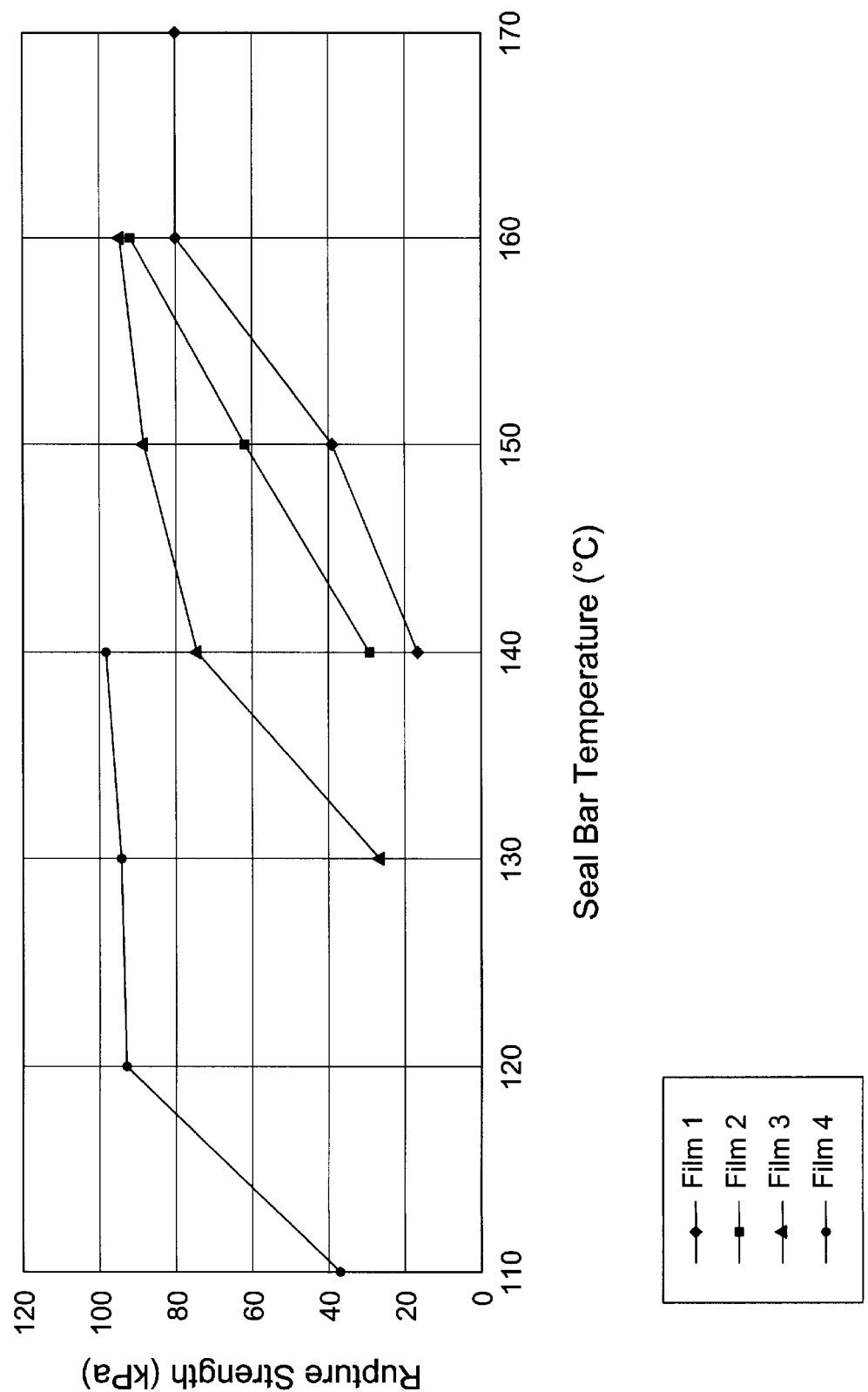
Figure 4:
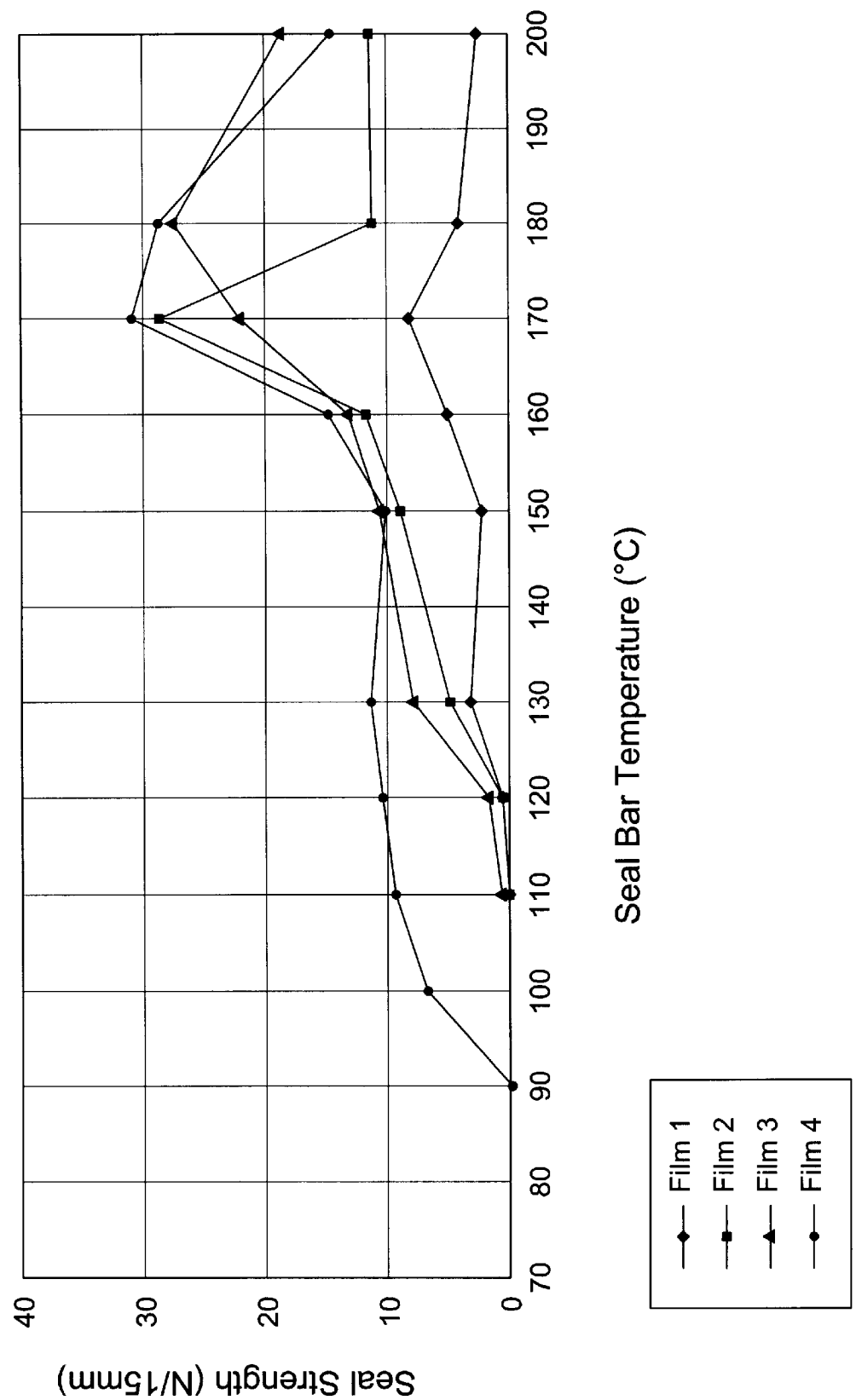
Figure 5:
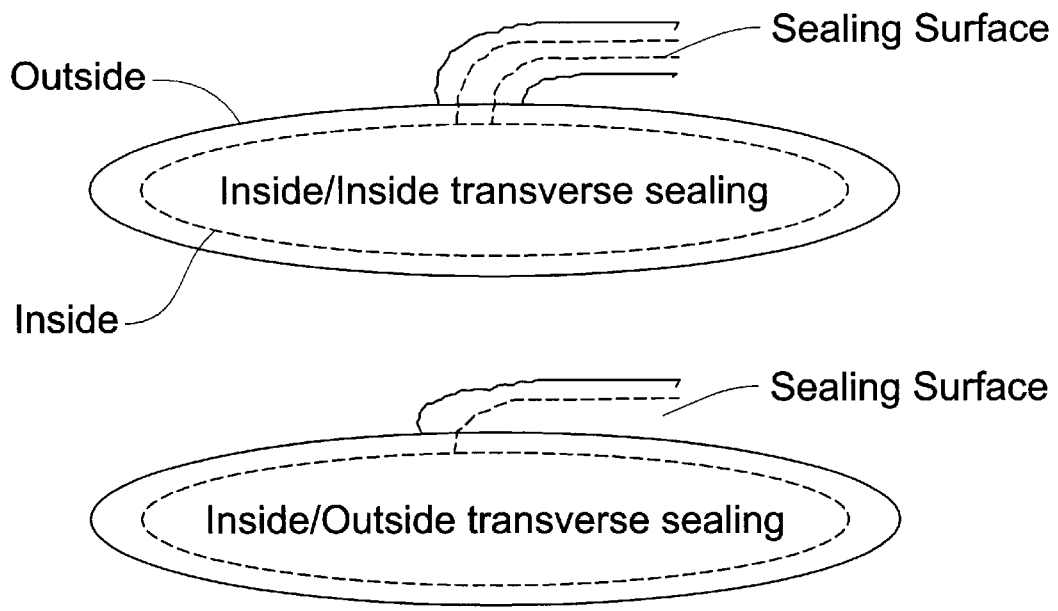
FIG. 5 is an illustration of inside—inside and inside-outside sealing.
Figure 6:
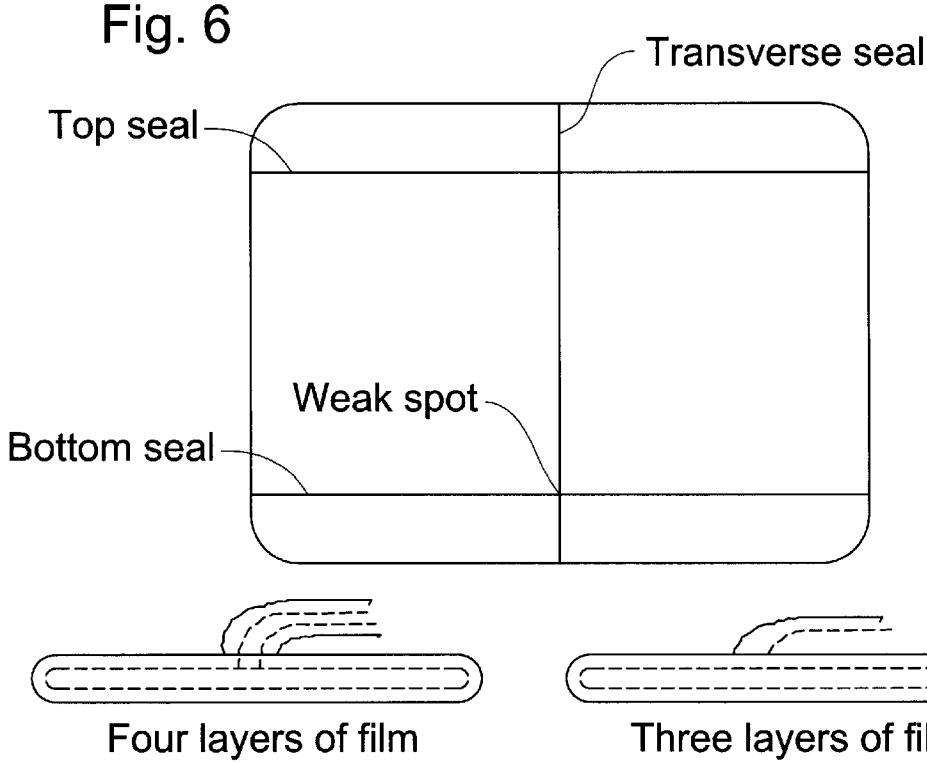
FIG. 6 is an illustration of the seals in a form fill and seal application.

In a preferred embodiment, this invention relates to a film comprising:

(i) a first surface layer comprising a homopolymer of ethylene having an Mw/Mn of 3 or less, preferably between 1 and 2.5 or a copolymer of ethylene and up to 50 weight %, preferably 1 to 35 weight %, preferably 1–20 weight % of one or more $C_3$ to $C_{20}$ olefins, (based upon the weight of the copolymer) having an Mw/Mn of 6 or less, preferably 3 or less, even more preferably between 1 and 2.5, wherein the polymer or copolymer preferably has:

a) a density of 0.88 $g/cm^3$ to 0.96 $g/cm^3$, preferably 0.86 to 0.94 $g/cm^3$, more preferably between 0.88 $g/cm^3$ and 0.935 $g/cm^3$, more preferably between 0.88 $g/cm^3$ and 0.93 $g/cm^3$, more preferably between 0.910 $g/cm^3$ and 0.925 $g/cm^3$; and b) a CDBI of 50% or more, preferably above 60%, and (ii) a second surface layer comprising a homopolymer of propylene or a copolymer of propylene and up to 50 weight %, preferably 1 to 35 weight %, even more preferably 1 to 6 weight % of ethylene and/or a $C_4$ to $C_{20}$ olefin.

Composition Distribution Breadth Index (CDBI) is a measure of the composition distribution of monomer within the polymer chains and is measured by the procedure described in PCT publication WO 93/03093, published Feb. 18, 1993 including that fractions having a weight average molecular weight (Mw) below 15,000 are ignored when determining CDBI. For purposes of this invention a homopolymer is defined to have a CDBI of 100%.

The $C_3$ to $C_{20}$ and $C_4$ to $C_{20}$ olefin comonomers for the polyethylene or polypropylene copolymers described above may be any polymerizable olefin monomer and are preferably a linear, branched or cyclic olefin, even more preferably an α-olefin. Examples of suitable olefins include propylene, butene, isobutylene, pentene, isopentene, cyclopentene, hexene, isohexene, cyclohexene, heptene, isoheptene, cycloheptene, octene, isooctene, cyclooctene, nonene, cyclononene, decene, isodecene, dodecene, isodecene, 4-methyl-pentene-1, 3-methyl-pentene-1, 3,5,5-trimethyl hexene-1. Suitable comonomers also include dienes, trienes, and styrenic monomers. Preferred examples include styrene, α-methyl styrene, para-alkyl styrene (such as para-methyl styrene), hexadiene, norbornene, vinyl norbornene, ethylidene norbornene, butadiene, isoprene, heptadiene, octadiene, and cyclopentadiene.

Preferred comonomers for the copolymer of ethylene are propylene, butene, hexene and/or octene.

The polyethylene or polypropylene copolymers described above may also contain termonomers and tetramonomers which may be one or more of the $C_3$ to $C_{20}$ olefins described above, any $C_4$ to $C_{30}$ linear, cyclic or branched dienes or trienes and any styreneic monomers such as styrene, α-methyl styrene, or para-methyl styrene. Preferred examples include butadiene, pentadiene, cyclopentadiene, hexadiene, cyclohexadiene, heptadiene, octadiene, nonadiene, norbornene, vinyl norbornene, ethylidene norbornene, isoprene and heptadiene.

The polyethylene copolymers described above preferably have a composition distribution breadth index (CDBI) of 50% or more, preferably above 60%, even more preferably above 70%. In one embodiment the CDBI is above 80%, even more preferably above 90%, even more preferably above 95%. In another particularly preferred embodiment, the polyethylene copolymer has a CDBI between 60 and 85%, even more preferably between 65 and 85%.

In a particularly preferred embodiment the ethylene homopolymer or copolymer has a CDBI of 65 to 85%, a density of 0.915 to 0.96 $g/cm^3$ and a Mw/Mn between 1 and 2.5.

In another preferred embodiment the ethylene homopolymer or copolymer has a density of 0.86 to 0.925 $g/cm^3$ and a CDBI of over 80%, preferably between 80 and 99%.

In another preferred embodiment the first surface layer comprises a homopolymer of ethylene having an Mw/Mn of 3 or less, preferably between 2.5 and 1.

In a preferred embodiment the polyethylene homopolymers and copolymers described above are metallocene polyethylenes (mPE's). The usage of the term polyethylene herein is defined to include metallocene polyethylenes. The mPE homopolymers or copolymers are typically produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings by may substituted or unsubstituted. Several commercial products produced with such catalyst/activator combinations are commercially available from Exxon Chemical Company in Baytown Tex. under the tradenames EXCEED™ and EXACT™. For more information on the methods and catalysts/activators to produce such mPE homopolymers and copolymers see WO 94/26816; WO 94/03506; EPA 277,003; EPA 277,004; U.S. Pat. No. 5,153,157; U.S. Pat. No. 5,198,401; U.S. Pat. No. 5,240,894; U.S. Pat. No. 5,017,714; CA 1,268,753; U.S. Pat. No. 5,324,800; EPA 129,368; U.S. Pat. No. 5,264,405; EPA 520,732; WO 92 00333; U.S. Pat. No. 5,096,867; U.S. Pat. No. 5,507,475; EPA 426 637; EPA 573 403; EPA 520 732; EPA 495 375; EPA 500 944; EPA 570 982; WO91/09882; WO94/03506 and U.S. Pat. No. 5,055,438.

The polypropylene homopolymer or copolymer preferably has an MFR (melt flow rate) of 1 to 20 as measured according to ASTM D 1238 (230° C., 2.16 kg). In another embodiment the polypropylene homopolymer or copolymer preferably has a CDBI of 50% or more, preferably above 60%, even more preferably above 70%. Polypropylenes having a CDBI above 60% are available from Exxon Chemical Company in Baytown, Tex. under the tradename ACHIEVE™.

In another embodiment the polypropylene homopolymer or copolymer can be blended with another propylene homopolymer or copolymer as described above or may be blended with another homopolymer and/or copolymer, including but not limited to, homopolypropylene, propylene copolymerized with up to 50 weight % of ethylene or a $C_4$ to $C_{20}$ α-olefin, polybutene, ethylene vinyl acetate, low density polyethylene (density 0.915 to less than 0.935 g/cm$^3$) linear low density polyethylene, ultra low density polyethylene (density 0.86 to less than 0.90 g/cm$^3$), very low density polyethylene (density 0.90 to less than 0.915 g/cm$^3$), medium density polyethylene (density 0.935 to less than 0.945 g/cm$^3$), high density polyethylene (density 0.945 to 0.98 g/cm$^3$), ethylene vinyl acetate, EMA, copolymers of acrylic acid, polymethylmethacrylate or any other polymers polymerizable by a high-pressure free radical process, polyvinylcholride, polybutene-1, isotactic polybutene, ABS resins, elastomers such as ethylene-propylene rubber (EPR), vulcanized EPR, EPDM, block copolymer elastomers such as SBS, nylons, polycarbonates, PET resins, crosslinked polyethylene, copolymers of ethylene and vinyl alcohol (EVOH), polymers of aromatic monomers such as polystyrene, poly-1 esters, high molecular weight polyethylene having a density of 0.94 to 0.98 g/cm$^3$, low molecular weight polyethylene having a density of 0.94 to 0.98 g/cm$^3$, graft copolymers generally, polyacrylonitrile homopolymer or copolymers, thermoplastic polyamides, polyacetal, polyvinylidine fluoride and other fluorinated elastomers, polyethylene glycols and polyisobutylene.

In a preferred embodiment the polypropylene is present in the blend at from 10 to 99 weight %, based upon the weight of the polymers in the blend, preferably 20 to 95 weight %.

In a preferred embodiment the second surface layer (ii) is a random copolymer of propylene and up to 6 weight % to ethylene.

The mPE homopolymers or copolymers described above for use as a surface layer may be used alone, may be blended with other mPE homopolymers or copolymers, or they may be blended with other polyolefin homopolymers and copolymers, including but not limited to, homopolypropylene, propylene copolymerized with up to 50 weight % of ethylene or a $C_4$ to $C_{20}$ α-olefin, polybutene, ethylene vinyl acetate, low density polyethylene (density 0.915 to less than 0.935 g/cm$^3$) linear low density polyethylene, ultra low density polyethylene (density 0.86 to less than 0.90 g/cm$^3$), very low density polyethylene (density 0.90 to less than 0.915 g/cm$^3$), medium density polyethylene (density 0.935 to less than 0.945 g/cm$^3$), high density polyethylene (density 0.945 to 0.98 g/cm$^3$), ethylene vinyl acetate, EMA, copolymers of acrylic acid, polymethylmethacrylate or any other polymers polymerizable by a high-pressure free radical process, polyvinylcholride, polybutene-1, isotactic polybutene, ABS resins, elastomers such as ethylene-propylene rubber (EPR), vulcanized EPR, EPDM, block copolymer elastomers such as SBS, nylons, polycarbonates, PET resins, crosslinked polyethylene, copolymers of ethylene and vinyl alcohol (EVOH), polymers of aromatic monomers such as polystyrene, poly-1 esters, high molecular weight polyethylene having a density of 0.94 to 0.98 g/cm$^3$, low molecular weight polyethylene having a density of 0.94 to 0.98 g/cm$^3$, graft copolymers generally, polyacrylonitrile homopolymer or copolymers, thermoplastic polyamides, polyacetal, polyvinylidine fluoride and other fluorinated elastomers, polyethylene glycols and polyisobutylene.

In a preferred embodiment the mPE, is present in the blend at from 10 to 99 weight % based upon the weight of the polymers in the blend, preferably the mPE is present at 20 to 95 weight %, even more preferably at least 30 to 90 weight %, even more preferably at least 40 to 90 weight %, even more preferably at least 50 to 90 weight %, even more preferably at least 60 to 90 weight %, even more preferably at least 70 to 90 weight %.

The blends described above may be produced by mixing the two or more polymers together, by connecting reactors together in series to make reactor blends or by using more than one catalyst in the same reactor to produce multiple species of polymer. The polymers can be mixed together prior to being put into the extruder or may be mixed in the extruder.

The polyethylene and polypropylene homopolymers or copolymers described above and the blends thereof are typically formed into bilayer or multilayer films. These films may be formed by any of the conventional techniques known in the art including extrusion, co-extrusion, extrusion coating, lamination, blowing and casting. The film may be obtained by the flat film or tubular process which may be followed by orientation in an uniaxial direction or in two mutually perpendicular directions in the plane of the film. For U.S. purposes a copending application to biaxially oriented mPE films in shrink wrap was filed on Nov. 22, 1996 under Ser. No. 08/755,105.

In a preferred embodiment mPE is used as the sealing layer.

This invention also relates to films as described above where one or more of the layers are oriented in the transverse and/or longitudinal directions to the same or different extents. This orientation may occur before or after the individual layers are brought together. For example the polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further.

A preferred embodiment includes a structure where the ethylene homopolymer or copolymer, preferably mPE, described above is coated, preferably extrusion coated or laminated, onto a film of polypropylene, preferably oriented polypropylene. The oriented polypropylene can be oriented in one direction or in both the longitudinal and transverse directions to the same or different degrees. Typically the films are oriented in the Machine Direction (MD) at a ratio of up to 15, preferably between 5 and 7, and in the Transverse Direction (TD) at a ratio of up to 15 preferably 7 to 9. However in another embodiment the film is oriented to the same extent in both the MD and TD directions.

In another preferred embodiment the mPE and the polypropylene surface layers are combined with optional other layers by adhesive lamination.

In another embodiment the polyethylene surface layer and the polypropylene surface layer are combined with one or more other layers. The other layer(s) may be any layer typically included in multilayer film structures. For example the other layer or layers may be:

1. Polyolefins

Preferred polyolefins include homopolymers or copolymers of $C_2$ to $C_{40}$ olefins, preferably $C_2$ to $C_{20}$ olefins, preferably a copolymer of an α-olefin and another olefin or α-olefin (ethylene is defined to be an α-olefin for purposes of this invention). Preferably homopolyethylene, homopolypropylene, propylene copolymerized with ethylene and or butene, ethylene copolymerized with one or more of propylene, butene or hexene, and optional dienes. Preferred examples include thermoplastic polymers such as ultra low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and blends of thermoplastic polymers and elastomers, such as for example, thermoplastic elastomers and rubber toughened plastics.

2. Polar polymers

Preferred polar polymers include homopolymers and copolymers of esters, amides, actates, anhydrides, copolymers of a $C_2$ to $C_{20}$ olefin, such as ethylene and/or propylene and/or butene with one or more polar monomers such as acetates, anhydrides, esters, alcohol, and or acrylics. Preferred examples include polyesters, polyamides, ethylene vinyl acetate copolymers, and polyvinyl chloride.

3. Cationic polymers

Preferred cationic polymers include polymers or copolymers of geminally disubstituted olefins, alpha-heteroatom olefins and/or styrenic monomers. Preferred geminally disubstituted olefins include isobutylene, isopentene, isoheptene, isohexane, isooctene, isodecene, and isododecene. Preferred alpha-heteroatom olefins include vinyl ether and vinyl carbazole, preferred styrenic monomers include styrene, alkyl styrene, para-alkyl styrene, alpha-methyl styrene, chloro-styrene, and bromo-para-methyl styrene. Preferred examples of cationic polymers include butyl rubber, isobutylene copolymerized with para methyl styrene, polystyrene, and poly-α-methyl styrene.

4. Miscellaneous

Other preferred layers can be paper, wood, cardboard, metal, metal foils (such as aluminum foil and tin foil), metallized surfaces, glass (including silicon oxide ($SiO_x$) coatings applied by evaporating silicon oxide onto a film surface), fabric, spunbonded fibers, and non-wovens (particularly polypropylene spun bonded fibers or non-wovens), and substrates coated with inks, dyes, pigments, PVDC and the like.

In addition, the multilayer structures can have more than one layer of the polyethylene or polypropylene homopolymer or copolymers, particularly the mPE homopolymers or copolymers. Further any of the above layers may be oriented before or after being combined with the two surface layers.

A particularly preferred embodiment includes an ABC structure film where the A layer comprises mPE or a blend comprising mPE and the B layer is isotactic polypropylene, highly isotactic polypropylene, one or more barrier layers, EVA, an adhesive layer/glue, or a metal foil, and the C layer is a random copolymer of propylene and up to 20 weight % of ethylene, preferably 3 to 6 weight % ethylene, even more preferably 3.5 to 5.5 weight % ethylene, or a terpolymer of propylene, ethylene and butene.

In a preferred embodiment films described herein, particularly bilayer films, are characterized by: 1) a heat seal strength of 8 N/15 mm or more at a seal bar temperature of 90 to 140° C., and 2) a rupture strength of 60 kPa or more when measured on a bag 110 mm wide by 180 mm long sealed at a seal bar temperature of 110 to 150° C. with a seal time of 300 msec.

In another preferred embodiment films described herein, particularly bilayer films, are characterized by: I) a heat seal strength of 8 N/15 mm or more at a seal bar temperature of 90 to 140° C., and 2) a rupture strength of 30 kPa or more when measured on a bag 110 mm wide by 180 mm long sealed at a seal bar temperature of 110 to 140 ° C. with a seal time of 300 msec.

The films may vary in thickness depending on the intended application, however films of a thickness from 1 to 250 μm are usually suitable. Films intended for packaging are usually from 10 to 60 μm thick. The thickness of the sealing layer is typically 0.2 to 50 μm. There may be a sealing layer on both the inner and outer surfaces of the film or the sealing layer may be present on only the inner or the outer surface.

In a preferred embodiment the first surface layer is heat sealed to the second surface layer.

Additives such as block, antiblock, antioxidants, pigments, fillers, processing aids, UV stabilizers, neutralizers, lubricants, surfactants and/or nucleating agents may also be present in one or more than one layer in the films. Preferred additives include silicon dioxide, titanium dioxide, polydimethylsiloxane, talc, dyes, wax, calcium sterate, carbon black, low molecular weight resins and glass beads.

In another embodiment one or both of surface layers may be modified by corona treatment, electron beam irradiation, gamma irradiation, or microwave. In a preferred embodiment one or both of the surface layers is modified by corona treatment.

The films described herein may also comprise from 5 to 60 weight %, based upon the weight of the polymer and the resin, of a hydrocarbon resin. The resin may be combined with the polymer of the seal layer(s) or may be combined with the polymer in the core layer(s). The resin preferably has a softening point above 100° C., even more preferably from 130 to 180° C. Preferred hydrocarbon resins include those described in EPA 288 227 and EPA 247 898. These films comprising a hydrocarbon resin may be oriented in uniaxial or biaxial directions to the same or different degrees. A preferred combination includes one surface layer of mPE and one surface or core layer of an isotactic polypropylene blended with hydrocarbon resin having a softening point between 130 and 180° C., preferably between 140 and 180° C.

In a preferred embodiment this invention also relates to a method to produce a heat sealable film comprising:

1) selecting a first polymer having a CDBI of 50% or more comprising homopolyethylene or a copolymer of ethylene and up to 50 weight % of a $C_3$ to $C_{20}$ olefin, 2) selecting a second polymer comprising homopolypropylene or a copolymer of propylene and up to 50 weight % of ethylene or a $C_4$ to $C_{20}$ olefin, 3) selecting optional polymers for core layers, and 4) combing the first polymer and second polymer so that the first polymer forms all or part of a film surface layer and the second polymer forms all or part of a film surface layer and, if present, the optional polymers for core layers are formed into film layers in between the first surface layer and the second surface layer. In a preferred embodiment the layers are combined by lamination or coextrusion.

In a preferred embodiment this invention also relates to a method to produce a heat sealed film comprising:

1) selecting a first polymer having a CDBI of 50% or more comprising homopolyethylene or a copolymer of ethylene and up to 50 weight % of a $C_3$ to $C_{20}$ olefin, 2) selecting a second polymer comprising homopolypropylene or a copolymer of propylene and up to 50 weight % of ethylene or a $C_4$ to $C_{20}$ olefin, 3) selecting optional polymers for core layers, 4) combing the first polymer and second polymer so that the first polymer forms all or part of a film surface layer and the second polymer forms all or part of a film surface layer and, if present, the optional polymers for core layers are formed into film layers in between the first surface layer and the second surface layer, and 5) heat sealing the first surface layer to the second surface layer.

In a preferred embodiment this invention also relates to a method of packaging an article comprising:

1) selecting a first polymer having a CDBI of 50% or more comprising homopolyethylene or a copolymer of ethylene and up to 50 weight % of a $C_3$ to $C_{20}$ olefin, 2) selecting a second polymer comprising homopolypropylene or a copolymer of propylene and up to 50 weight % of ethylene or a $C_4$ to $C_{20}$ olefin, 3) selecting optional polymers for core layers, 4) combing the first polymer and second polymer so that the first polymer forms all or part of a film surface layer and the second polymer forms all or part of a film surface layer and, if present, the optional polymers for core layers are formed into film layers in between the first surface layer and the second surface layer, 5) enclosing an article in the film, and 6) heat sealing the enclosed article such that at least one seal is formed by heat sealing the first surface layer to the second surface layer.

The films produced herein may be used for typical packaging applications, form fill and seal applications, cling films, stretch films, shrink wrap, can liners and the like.

EXAMPLES

MATERIALS:

ECD 103 is an ethylene hexene copolymer produced in the gas phase having approximately 7.6 weight % hexene, a melt index of about 1 g/10 min, a Mw/Mn of about 2.3, a CDBI of about 67% and a density of about 0.917 g/cm³, sold under the tradename EXCEED™ by Exxon Chemical Company in Baytown, Tex.

EXACT 3132 is an ethylene hexene copolymer produced in a high pressure process having about 15.4 weight % hexene, a melt index of about 1.2 g/10 min, a density of about 0.900 g/cm³, a CDBI of about 91%, and an Mw/Mn of about 1.9 produced by and available from Exxon Chemical Company in Baton Rouge, Tex.

AL 3108 XV is an ethylene hexene copolymer having about 10.6 weight % hexene, a melt index of about 0.8 g/10 min, a density of about 0.921 g/cm³, and a CDBI of about 24% produced by and available from Exxon Chemical Company in Baytown, Tex.

DOW NG 5056 E01 and Dow 5056 E are ethylene octene copolymers having about 11.6 weight % octene, an Mw/Mn of about 3.1, a melt index of about 1 g/10 min, a density of about 0.919 g/cm³, and a CDBI of about 45% produced by and available from Dow Chemical Company in Zurich, Switzerland. E differs from E01 in that slip and antiblock additives are included in E01.

VITRA BOPP is a 25 μm thick trilayer film of an ABA structure where the A layer is a random copolymer of propylene with about 4.5 weight % ethylene (RCP), and the B layer is a homopolymer of isotactic polypropylene, available from VITRA located in Wommelgem, Belgium. One of the A layers was corona treated for a final surface tension of about 38 dynes/cm (38 mN/m).

TESTING METHODS:

Composition Distribution Breadth Index (CDBI) is measured by the procedure described in PCT publication WO 93/03093, published Feb. 18, 1993. Fractions having a molecular weight (Mw) less than 15,000 were ignored. Melt Index (MI) was measured according to ASTM D 1238. (190° C., 2.16 kg) Density was measured according to ASTM D1505. Mw and Mn were measured by GPC (Gel Permeation Chromatography) on a Waters 150 gel permeation chromatograph equipped with a differential refractive index (DRI) detector and a Chromatix KMX-6 on line light scattering photometer. The system was used at 135° C. with 1,2,4-trichlorobenzene as the mobile phase. Shodex (Showa Denko America, Inc) polystyrene gel columns 802, 803, 804 and 805 were used. This technique is discussed in "Liquid Chromatography of Polymers and Related Materials III", J. Cazes editor, Marcel Dekker. 1981, p. 207, which is incorporated herein by reference. No corrections for column spreading were employed; however, data on generally accepted standards, e.g. National Bureau of Standards Polyethylene 1484 and anionically produced hydrogenated polyisoprenes (an alternating ethylene-propylene copolymer) demonstrated that such corrections on Mw/Mn (=MWD) were less than 0.05 units. Mw/Mn was calculated from elution times. The numerical analyses were performed using the commercially available Beckman/CIS customized LALLS software in conjunction with the standard Gel Permeation package. Calculations involved in the characterization of polymers by $^{13}$CNMR follow the work of F. A. Bovey in "Polymer Conformation and Configuration" Academic Press, New York, 1969. Rupture strength was measured according to the following procedure. On a Rovema Packaging Line, as soon as the packaging line was running smoothly and all sealing bar temperatures were at equilibrium and stabilized, at least five sealed pouches were randomly taken and immediately subjected to the Skye integrity test, i.e. through a fine needle an air stream with an inlet pressure of 3 bar (300 kPa) and constant air flow of 5 mbar (0.5 kPa) was blown into the pouch. During this process the air pressure inside the bag was continiously measured and at moment of structural failure, the air pressure was recorded. The average of at least 4 failures was reported as the rupture strength. The bag was 110 mm wide and 180 mm long. The machine settings are reported in the table below.

|  | machin type: | Rovem MVP |  |
|---|---|---|---|
|  | ° Start | ° Stop | msec |
| Sector 1 | 001 | 090 | variable |
| Sector 2 | 091 | 180 | 1000 |
| Sector 3 | 181 | 270 | 1000 |
| Sector 4 | 271 | 000 | 1000 |
|  | bag | 180 mm |  |
|  | bag | 110 mm |  |
|  | structur | 240 mm |  |
|  | seal | heat |  |
|  | seal | overlap |  |
|  | vertical | 10 mm |  |
|  | horizont | 14 mm |  |
|  | averag | ±1.2 |  |
|  | transpo | −5.5 |  |

Heat seal testing procedure: Seal were made on a Topwave sealing machine. The film was folded between TEFLON™ film and inserted between the sealing bars. At various the sealing bars were closed with a pressure of 0.5 MPa for 0.5 seconds. The film was removed from the Top wave machine and conditioned for a minimum of 12 hours at 23° C.±3° C. and 50% humidity±5% humidity.

Seal Strength was tested according to the following procedure. After conditioning for a minimum of 12 hours at 23° C.±3° C. and 50% humidity±5% humidity, the seal strength of 15 mm wide sample was measured in a Zwick tensile instrument under the following conditions: speed-100 mm/min, load cell-200N, and clamp distance-50 mm. The film was placed between the clamps and the clamps were moved apart at a speed of 100 mm/min. During the rest the force (N) was recorded as a function of elongation (%). Four test specimens were measured and the average seal strength curve was recorded. The seal strength was the force at which the test specimen failed.

Elmendorf Tear Strength (N/$\mu$m) was measured by ASTM 1922.

Example 1

Four trilayer polyethylene films (50 $\mu$m thick, approximately 17 $\mu$m per layer) were produced on a three layer Barmag blown film line with a die of 250 mm and a gap of 1.6 mm under the conditions listed in Tables 1–4. Table 5 shows the composition of the films. Thereafter the films were laminated to the 25 $\mu$m thick VITRA BOPP film which had been corona treated and had a measured surface tension of 38 dynes/cm(38 mN/m). Prior to adhesive lamination the polyethylene films had also been corona treated. The outside layer of the polyethylene film was laminated to the treated side of the VITRA BOPP film. The films were laminated on an RK Print Coat Rotary Koater laminator to the VITRA BOPP using an adhesive comprising ADCOTE™ 301A, ADCOTE™ 350A (6:4 ratio by weight) and ethyl acetate as solvent mixed at a 30% solids level. ADCOTE chemicals are availabe from Morton International in Germany. Table 6 contains lamination details.

TABLE 1

Film 1

| Extruder temperature (° C.) [zone 1/zone 2/zone 3/zone 4] | 170/190/210/210 |
|---|---|
| melt temperature (° C.) [layer 1/layer 2/layer 3] | 240/237/248 |
| melt pressure (kPa) [layer 1/layer 2/layer 3] | 3260/3590/3300 |
| extruder speed (rpm) [layer 1/layer 2/layer 3] | 37/34/39 |
| extruder output (kg/hr) [layer 1/layer 2/layer 3] | 34.0 35.0/34.5 |
| head temperature (° C.) | 210 |
| blow up ratio//lay flat width (mm) | 2.20//865 |
| frost line height (mm)//haul off speed (m/min) | 510//22.6 |
| Corona treatment level (mN/m) | 50 |

TABLE 2

Film 2

| Extruder temperature (° C.) [zone 1/zone 2/zone 3/zone 4] | 170/190/210/210 |
|---|---|
| melt temperature (° C.) [layer 1/layer 2/layer 3] | 226/230/241 |
| melt pressure (kPa) [layer 1/layer 2/layer 3] | 2890/2940/2640–2680 |
| extruder speed (rpm) [layer 1/layer 2/layer 3] | 27/28/30–31 |
| extruder output (kg/hr) [layer 1/layer 2/layer 3] | 32.9/33.6/32.5 |
| head temperature (° C.) | 210 |
| blow up ratio//lay flat width (mm) | 2.20//865 |
| frost line height (mm)//haul off speed (m/min) | 625//20.8–21.1 |
| Corona treatment level (mN/m) | 50 |

TABLE 3

Film 3

| Extruder temperature (° C. ) [zone 1/zone 2/zone 3/zone 4] | 170/190/210/210 |
|---|---|
| melt temperature (° C.) [layer 1/layer 2/layer 3] | 234/235/245 |
| melt pressure (kPa) [layer 1/layer 2/layer 3] | 3150/3360/2910 |
| extruder speed (rpm) [layer 1/layer 2/layer 3] | 33/30/32 |
| extruder output (kg/hr) [layer 1/layer 2/layer 3] | 32.0/32.0/32.0 |
| head temperature (° C.) | 210 |
| blow up ratio//lay flat width (mm) | 2.20//865 |
| frost line height (mm)//haul off speed (m/min) | 600//20.4 |
| Corona treatment level (mN/m) | 50 |

TABLE 4

Film 4

| Extruder temperature (° C.) [zone 1/zone 2/zone 3/zone 4] | 170/190/210/210 |
|---|---|
| melt temperature (° C.) [layer 1/layer 2/layer 3] | 228/236/245 |
| melt pressure (kPa) [layer 1/layer 2/layer 3] | 3110/3660/3120 |
| extruder speed (rpm) [layer 1/layer 2/layer 3] | 27/32/34 |

TABLE 4-continued

Film 4

| | |
|---|---|
| [layer 1/layer 2/layer 3] extruder output (kg/hr) | 34.3/34.1/33.8 |
| [layer 1/layer 2/layer 3] head temperature (° C.) | 210 |
| blow up ratio//lay flat width (mm) | 2.20//865 |
| frost line height (mm)//haul off speed (m/min) | 550//21.1 |
| Corona treatment level (mN/m) | 50 |

TABLE 5

| | Seal layer | | Core layer | | Outside layer | |
|---|---|---|---|---|---|---|
| Film | polymer | additives (ppm) | polymer | additives (ppm) | polymer | additives (ppm) |
| film 1 | AL 3108 XV | 2000 AB 600 PPA | AL 3108 XV | 1400 S | AL 3108 XV | 2000 AB 600 PPA |
| film 2 | Dow 5056 E 01 Dow 5056 E 70/30 blend | 400 PPA | Dow 5056 E 01 Dow 5056 E 70/30 blend | | Dow 5056 E 01 Dow 5056 E/ 30% | 400 PPA |
| film 3 | ECD 103 | 2500 AB 200 PPA | ECD 103 | 1500 S | ECD 103 | 2500 AB 200 PPA |
| film 4 | EXACT 3132 | 1250 S 3500 AB 1000 PP | ECD 103 | | ECD 103 | 350 S 2500 AB 200 PPA |

S = slip, Schulman's Polybatch CE 505E,
AB = antiblock, Schulman's Polybatch F15,
PPA = polymer processing aid, Schulman's Polybatch AMF 702.

TABLE 6

(temperature 20° C.)

| | Film 1/VITRA BOPP | Film 2/VITRA BOPP | Film 3/VITRA BOPP | Film 4/VITRA BOPP |
|---|---|---|---|---|
| Corona Treatment level (dyne/cm (mN/m)) | 44 on film 1 | 38 on film 2 | 48 on film 3 | 48 on film 4 |
| adhesive coating weight (g/m²) | 1.6–2.01 | 1.72–1.88 | 1.95–2.02 | 1.83–2.17 |
| Laminator | | | | |
| Gravure roll | TR 26 | TR 26 | TR 26 | TR 26 |
| Pressure head (kPa) | 300 | 300 | 300 | 300 |
| Temp. drying oven (° C.) | 75 | 75 | 75 | 75 |
| Pressure nip roll (kPa) | 450 | 450 | 450 | 450 |
| Temp. nip roll (° C.) | 60 | 60 | 60 | 50 |
| Pressure winding (kPa) | 250 | 250 | 250 | 250 |
| Line speed (m/min) | 8 | 8 | 8 | 8 |

TR-26 is a gravure roll supplied by RK Print Coat.

These laminated films were then tested for rupture strength. The data are reported in Tables 7, 8, 9, and 10. All seals were between the surface layer of mPE and the corona treated RCP layer of the VITRA BOPP.

TABLE 7

| Film 1/VITRA BOPP Seal Time (msec) | | Rupture Strength (kPa) | | | | | | | |
|---|---|---|---|---|---|---|---|---|---|
| Horiz. SBT (° C.) | Vert. SBT (° C.) | 500 | 450 | 400 | 350 | 300 | 250 | 200 | 150 |
| 140 | 140 | 17.3 | 13.5 | 8.6 | 3.2 | 0.6 | 0 | | |
| 140 | 150 | 29.3 | 13.1 | 7.5 | 3.4 | 1.0 | 0 | | |
| 150 | 150 | 39.4 | 41.0 | 34.0 | 21.5 | 8.0 | 3.2 | 0.1 | 0 |
| 150 | 160 | 66.0 | 56.2 | 48.0 | 28.0 | 14.1 | 5.5 | 2.6 | 0 |
| 160 | 160 | 80.2 | 79.5 | 80.8 | 72.7 | 48.8 | 30.8 | 19.6 | 5.6 |
| 160 | 170 | 85.7 | 92.2 | 89.2 | 75.9 | 67.7 | 43.0 | 21.3 | 7.5 |
| 170 | 170 | 90.9 | 94.0 | 92.1 | 86.6 | 85.6 | 78.7 | 53.5 | 28.1 |
| 170 | 180 | 95.4 | 100.0 | 95.6 | 92.9 | 91.8 | 80.8 | 65.4 | 39.2 |

SBT = Seal Bar Temperature

TABLE 8

| Film 2/VITRA BOPP Seal Time (msec) | | Rupture Strength (kPa) | | | | | | | |
|---|---|---|---|---|---|---|---|---|---|
| Horiz. SBT (° C.) | Vert. SBT (° C.) | 500 | 450 | 400 | 350 | 300 | 250 | 200 | 150 |
| 130 | 140 | 19.6 | 12.1 | 3.8 | 1.1 | 0 | | | |
| 140 | 140 | 30.7 | 30.8 | 28.7 | 22.9 | 13.1 | 0 | | |
| 140 | 150 | 57.2 | 64.6 | 56.0 | 40.1 | 30.6 | 13.2 | 0.1 | 0 |
| 150 | 150 | 61.7 | 74.7 | 59.6 | 60.4 | 40.5 | 33.5 | 26.1 | 12.5 |
| 150 | 160 | 89.2 | 89.2 | 79.7 | 84.8 | 75.9 | 66.0 | 31.6 | 17.3 |
| 160 | 160 | 93.8 | 94.1 | 88.8 | 82.4 | 83.0 | 83.9 | 76.3 | 59.6 |
| 160 | 170 | 97.7 | 94.0 | 96.6 | 86.4 | 87.6 | 74.3 | 75.7 | 64.4 |

SBT = Seal Bar Temperature

TABLE 9

| Film 3/VITRA BOPP Seal Time (msec) | | Rupture Strength (kPa) | | | | | | | |
|---|---|---|---|---|---|---|---|---|---|
| Horiz. SBT (° C.) | Vert. SBT (° C.) | 500 | 450 | 400 | 350 | 300 | 250 | 200 | 150 |
| 130 | 130 | 27.4 | 13.6 | 11.5 | 0 | | | | |
| 130 | 140 | 53.5 | 37.6 | 24.8 | 5.1 | 0 | | | |
| 140 | 140 | 73.7 | 70.9 | 57.0 | 50.6 | 38.8 | 23.2 | 0 | |
| 140 | 150 | 84.0 | 75.5 | 68.3 | 57.5 | 46.1 | 22.1 | 1.4 | 0 |
| 150 | 150 | 87.1 | 81.2 | 84.3 | 78.7 | 80.5 | 64.2 | 48.5 | 22.3 |
| 150 | 160 | 95.1 | 95.8 | 87.0 | 84.6 | 78.1 | 65.5 | 45.4 | 27.2 |
| 160 | 160 | 95.8 | 97.1 | 98.3 | 88.2 | 81.8 | 72.1 | 74.5 | 57.7 |
| 160 | 170 | 100.5 | 98.0 | 96.1 | 97.3 | 95.8 | 89.4 | 78.0 | 63.0 |

SBT = Seal Bar Temperature

TABLE 10

| Film 4/VITRA BOPP Seal Time (msec) | | Rupture Strength (mPa) | | | | | | | |
|---|---|---|---|---|---|---|---|---|---|
| Horiz. SBT (° C.) | Vert. SBT (° C.) | 500 | 450 | 400 | 350 | 300 | 250 | 200 | 150 |
| 110 | 110 | 35.5 | 29.8 | 22.8 | 13.9 | 6.3 | 2.8 | 0 | |
| 110 | 120 | 55.4 | 50.6 | 40.5 | 24.8 | 16.3 | 12.3 | 3.3 | 0 |
| 120 | 120 | 92.9 | 81.0 | 89.5 | 70.2 | 54.7 | 33.2 | 20.2 | 9.5 |
| 120 | 130 | 94.7 | 93.3 | 80.3 | 69.3 | 60.7 | 39.7 | 22.0 | 16.4 |
| 130 | 130 | 93.0 | 99.3 | 98.3 | 94.3 | 85.9 | 85.1 | 70.1 | 49.0 |
| 130 | 140 | 96.0 | 96.9 | 95.2 | 93.5 | 91.8 | 84.2 | 66.9 | 40.2 |
| 140 | 140 | 98.7 | 101.2 | 99.3 | 91.2 | 100.2 | 91.3 | 84.3 | 82.2 |

SBT = Seal Bar Temperature

The four laminated films were then tested for seal strength of the PE layer to the PP layer. The data are reported in Table 11. All seals were between the surface layer of mPE and the corona treated RCP layer of the VITRA BOPP.

TABLE 11

Seal Strength (N/15 mm)

| Seal Temp. (° C.) | Film 1 | Film 2 | Film 3 | Film 4 |
|---|---|---|---|---|
| 90 | | | | 0.11 |
| 100 | | | | 6.48 |
| 110 | 0.05 | 0.12 | 0.22 | 9.47 |
| 120 | 0.24 | 0.46 | 1.54 | 10.50 |
| 130 | 3.00 | 4.69 | 7.72 | 11.30 |
| 150 | 2.45 | 8.83 | 10.80 | 10.10 |
| 160 | 4.89 | 11.90 | 13.20 | 14.90 |
| 170 | 8.14 | 28.20 | 22.20 | 30.80 |
| 180 | 4.25 | 11.40 | 27.70 | 28.60 |
| 200 | 2.85 | 11.50 | 18.80 | 14.90 |

The films were then tested for Elmendorf Tear Strength. The data are reported in Table 12.

TABLE 12

Elmendorf Tear Strength (cN/μm)

| | Film 1 | Film 2 | Film 3 | Film 4 |
|---|---|---|---|---|
| Machine Direction | <1.0* | <1.0* | 1.5 | 1.4 |
| Transverse Direction | 1.1 | 2.4 | 2.2 | 1.2 |

*value too low to be measured.

All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A form fill and seal process using a film, said process comprising:

a) selecting a first surface polyethylene layer for said film (A), where said polyethylene layer consists essentially of a copolymer of ethylene and up to 50 weight % of a $C_3$–$C_{20}$ alpha-olefin having a CDBI of 50% or more; and b) selecting a second surface polypropylene layer for said film (B), where said polypropylene is a homopolymer of propylene or a copolymer of propylene and up to 50 weight % of a comonomer;

wherein a transverse seal is made by sealing said polyethylene layer to said polypropylene layer or vice versa.

2. The form fill and seal process of claim 1 wherein said polyethylene has an Mw/Mn of 3 or less and a CDBI of 60% or greater, and wherein said polypropylene is copolymerized with ethylene and/or a $C_4$ to $C_{20}$ olefin.

3. The form fill and seal process of claim 1 wherein said polyethylene has an Mw/Mn of between 1 and 2.5 and a density of between 0.88 g/cm$^3$ and 0.96 g/cm$^3$, and wherein said polypropylene is copolymerized with ethylene, where said ethylene is present from 1 to 6 weight %.

4. The process of claim 1 further comprising forming a bag from said film.

5. The process of claim 1 further comprising packaging an article with said film.

6. The process of claim 5 wherein said article is one of nuts or candy.

* * * * *